United States Patent [19]

Kobayashi

[11] 4,377,069
[45] Mar. 22, 1983

[54] BRAKE BOOSTER

[75] Inventor: Hideyuki Kobayashi, Toyota, Japan

[73] Assignee: Aisin Seiki Kabushiki Kaisha, Kariya, Japan

[21] Appl. No.: 236,102

[22] Filed: Feb. 19, 1981

[30] Foreign Application Priority Data

Feb. 27, 1980 [JP] Japan .................................. 55-24550

[51] Int. Cl.³ .............................................. B60T 13/00
[52] U.S. Cl. ..................................... 60/547.1; 92/169; 92/161; 91/369 A
[58] Field of Search ............... 60/547 R; 92/169, 161; 91/369 A, 376 R

[56] References Cited

U.S. PATENT DOCUMENTS

| 4,246,755 | 1/1981 | Weiler | 60/547 R |
| 4,270,353 | 6/1981 | Thomas | 60/547 R |
| 4,291,534 | 9/1981 | Jones | 60/547 R |

*Primary Examiner*—Abraham Hershkovitz

*Attorney, Agent, or Firm*—Oblon, Fisher, Spivak, McClelland & Maier

[57] ABSTRACT

This invention relates to a brake booster for automotive vehicles including a housing, a brake master cylinder connected to the housing and a diaphragm power piston dividing the housing into first and second fluid chambers and having a retracted position defined by abutment with the housing and a control valve mechanism for the diaphragm power piston to control the pressure differential between the chambers in response to brake pedal movement axially relative to the power piston, wherein at least two bolts extend from the master cylinder outside of and past the housing toward a dash board of a vehicle for installation. A brake reactional force is transmitted by the bolts from the master cylinder directly to the dash board bypassing the housing, the thickness of the sheet metal forming the housing being thus calculated to be a lesser gauge for weight decreasing purposes than would otherwise be required.

5 Claims, 3 Drawing Figures

BRAKE BOOSTER

BACKGROUND OF THE INVENTION

1. Field of the Invention

This invention relates to brake booster assemblies or servo motors of the type used to operate power-assisted brakes.

2. Description of the Prior Art

Known brake booster assemblies usually consist of a housing having a power piston and diaphragm forming a movable wall for reciprocable movement in the housing or container, the movable wall dividing the housing into two compartments. A pressure differential across the movable wall causes movement of the wall. A control valve operated by the operator of the vehicle regulates the degree of vacuum or subatmospheric pressure established at one side of the movable wall. The movable wall is connected with the master cylinder of the hydraulic brake system of the motor vehicle so that when a pressure differential is effective on the movable wall, i.e. power movement of the wall is produced, hydraulic fluid is displaced from the master cylinder into the hydraulic brake system to apply the brakes of the vehicle.

In the past, the brake master cylinder has been bolted to the front end wall of the housing and the rear end wall of the housing has been in turn bolted to a dash board of the vehicle body in order to install the brake booster assembly in the vehicle together with the master cylinder. In this arrangement, a reactional force developed in the brake master cylinder when in operation is transmitted through the housing to the dash board. This is considered a defect in that, the arrangement necessitates a heavy gauge sheet metal for the housing sufficiently to avoid any tendency of strain of the housing due to the reactional force.

SUMMARY OF THE INVENTION

A principal object of the invention is to provide an improved brake booster assembly or servomotor having a master cylinder directly connected to a dash board so that a brake reactional force from the master cylinder is directly transmitted to the dash board bypassing the housing, any tendency of strain of the housing due to the reactional force being thus avoided with the result that thickness of the housing can be calculated to the minimum beneficially for weight decreasing purpose.

The foregoing object of the invention is attained according to at least one aspect of the invention by provision of long bolts to directly connect the brake master cylinder to the dash board bypassing the housing on the outside.

Thus the embodiment of the invention comprises a housing, a brake master cylinder connected to the housing and a diaphragm power piston dividing the housing into first and second fluid chambers and having a retracted position defined by abutment with the housing and a control valve mechanism for the diaphragm power piston to control the pressure differential between the chambers in response to brake pedal movement axially relative to the power piston, wherein at least two bolts extend from the master cylinder outside of and past the housing toward a dash board of a vehicle for installation. A brake reactional force is transmitted by the bolts from the master cylinder directly to the dash board bypassing the housing, the thickness of the sheet metal forming the housing being thus calculated beneficially to a lesser gauge for weight decreasing purposes.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
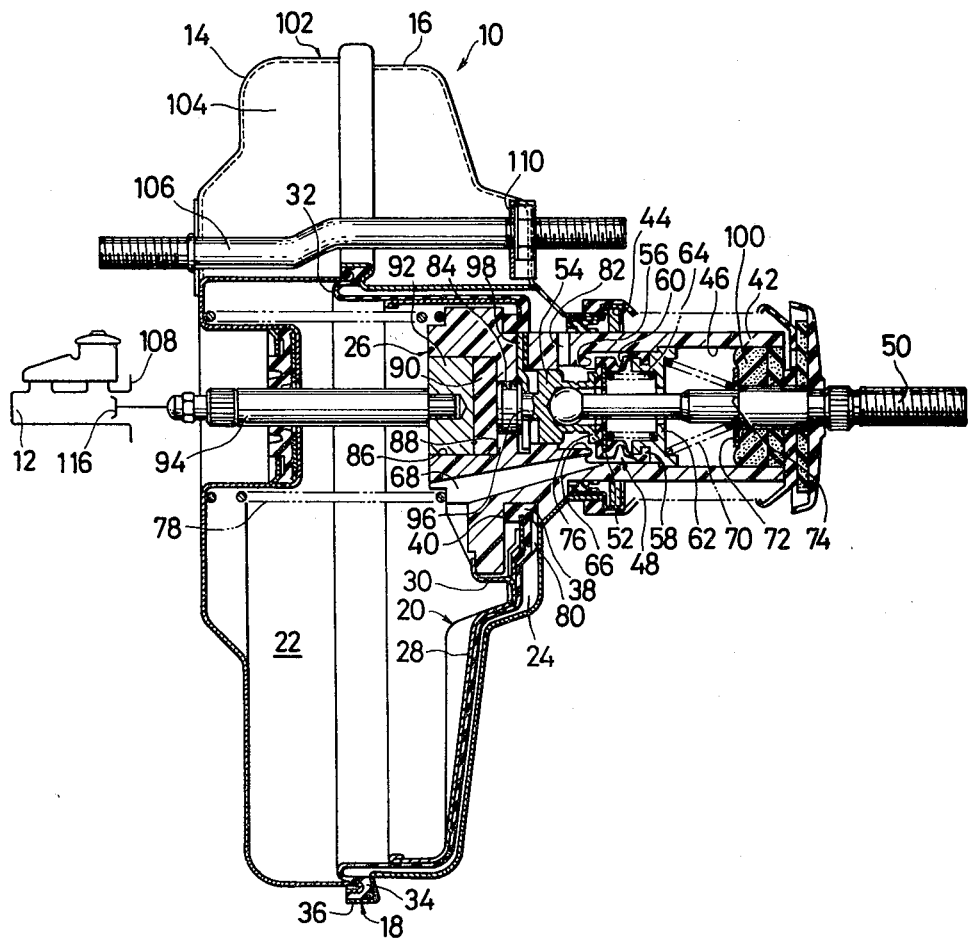
FIG. 1 is an axial cross section taken along the line I—I in FIG. 2, with a brake master cylinder shown diagrammatically in a different scale.

The brake booster of FIG. 1 has a fluid pressure servomotor 10 connected to a master cylinder 12 for applying to the front wheel brakes and rear wheel brakes (not shown) an operational hydraulic force in response to an input force applied to a pedal (not shown) by an operator.

The fluid pressure servomotor 10 has a first housing shell 14 fast to a second housing shell 16 by a twist lock arrangement 18. A power piston 20 is located within the first shell 14 and the second shell 16 to form a first variable volume chamber 22 and a second variable volume chamber 24. The power piston 20 comprises a central hub 26 with a diaphragm backing plate 28 in clamping engagement therewith via fingers 30 (only one being shown). A diaphragm 32 has a first bead 34 on its periphery which is held between flange 36 of the second shell 16 and the first shell 14, and a second bead 38 which is snapped into groove 40 adjacent the backing plate 28 and holding the edge of the backing plate 28.

The hub 26 has a rearwardly extending projection 42 which extends through opening 44 in the second shell 16. The projection 42 has an axial bore 46 into which a control valve mechanism 48 is located for supplying an operational input from a pedal (not shown) through push rod 50.

The control valve mechanism 48 has a valve assembly 52 which is sequentially operated upon movement of a plunger 54 by the push rod 50 to interrupt vacuum and allow air to develop a pressure differential across the power piston 20.

The valve assembly 52 has a face 56 separated from a fixed bead 58 by a flexible section 60. The bead 58 is retained within the bore 46 by a retainer 62. A first spring 64 connected to the retainer 62 urges the face 56 toward a first valve seat 66 adjacent a vacuum passage 68. The first valve seat 66 will be referred to herein as the vacuum seat 66. The vacuum passage 68 connects the first chamber 22 with the interior of the bore 46 of the hub 26. A second spring 70, located between the retainer 62 and a ring 72 abutting a shoulder 74 of the push rod 50, urges a second valve seat 76 on the plunger 54 into contact with face 56. The second valve seat 76 will be referred to herein as the air seat.

A return spring 78 located between the shell 14 and the hub 26 urges a buffer 80 on the diaphragm 32 towards the shell 16. In this position, vacuum communicated from the intake manifold through a non-illustrated conduit past a check seat (not shown) into the front chamber 22 will evacuate air from the second variable chamber 24 by way of a radial passage 82, the bore 46 and the vacuum passage 68 to effect rest position of the power piston 20.

The left forward end of the plunger 54 extends into an opening 84 which communicates with a reaction chamber 86. The reaction chamber 86 is of a stepped bore type to form an annular shoulder 88. Within the stepped reaction chamber 86 are captive a rubber-like material 90 and a head 92 of a driven member 94. The driven member 94 connects with a master piston 116 of the brake master cylinder 12.

The plunger 54 is formed with a reduced diameter portion 96 which is movably straddled by a bifurcated stem of a key 98. The key 98 is fast fit in a corresponding radial bore in the wall of the hub 26 as shown to provide a stopper means for the plunger 54 in the position shown by being in abutting engagement with the interior of the diametrically reduced portion 96.

The assembly operates as follows. In the position shown, every part of the braking servomotor 10 occupies its rest position. It should be noted that in this position there is a small clearance between the vacuum seat 66 and face 56, while the air seat 76 engages the face 56 of the valve assembly 52 so that the chamber 24 is in communication with the other chamber 22 and both are at subatmospheric pressure. Air at atmospheric pressure present in the bore 46 through a filter 100, is isolated from both chambers.

When an operator applies an input force to a brake pedal (not shown), the push rod 50 will move to allow spring 64 to move the face 56 of the valve assembly 52 against the vacuum seat 66 to interrupt communication between the first chamber 22 and the bore 46 through the passage 68. The clearance is calculated to be the minimum which is sufficient to maintain communication between the first chamber 22 and the bore 46 in the rest position. Further movement of the push rod 50 will move the atmospheric seat 76 away from the face 56 to allow air at atmospheric pressure, present in the bore 46, to enter the rear chamber 24 through the passage 82. With air in the rear chamber 24 and vacuum in the front chamber 22, a pressure differential exists across the power piston 20. This pressure differential will create an operational force which will be transmitted through the hub means 26 to move the head 92 of the driven member 94 through rubber material 90, so that braking fluid pressure is developed in the brake master cylinder 12 in the ordinary manner.

In this operation, a major part of the reactional force developed in the reaction rubber material 90 is received by the shoulder 88 of the power hub 26 of the power piston 20 while the remainder is received by the plunger 54 and in turn by the push rod 50 to be sensed by the operator through the braking pedal (not shown).

An important or essential feature of the servomotor 10 is described hereinbelow with reference to FIGS. 2 and 3.

Figure 2:
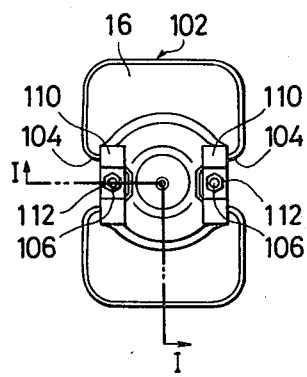
FIG. 2 is a side view of a brake booster assembly according to the invention seen from the right in FIG. 1.
Figure 3:
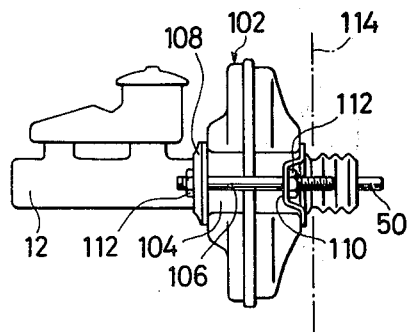
FIG. 3 is an elevation of the brake booster assembly in FIG. 1.

As will be seen in FIG. 2, the housing shells 14 and 16 form a housing 102 having a pair of constrictions or recesses in its contour shown at 104 shaped somewhat like a peanut. Bolts 106 extend from a flange 108 (FIG. 3) of the master cylinder 12 to washers 110. The bolts loosely pass through the flange 108 and the washers 110 to be in screwed engagement with nuts 112 at both extremities, respectively. The right end of each bolt 106 further extends beyond the washer 110 sufficiently to pass through a dash board 114 (FIG. 3) shown in phantom by a dotted-and-dashed lines and engage with another nut (not shown) so as to fasten the housing 102 to the dash board 114 together with the master cylinder 12. The above arrangement provides common means for connecting the housing and the master cylinder and for installation of the housing to the dash board.

When the booster 10 is in operation, and hence braking fluid pressure is developed in the master cylinder 12, a brake reactional force is transmitted from the flange 108 through bolts 106 to the dash board 114, bypassing the housing 102. This is very purpose of the invention. The above arrangement is effective to calculate the thickness of the sheet metal of the housing 102 so as to be the minimum sufficient thickness to maintain the housing 102 in a preset shape against merely atmospheric pressure and the spring bias of the restoring spring 78. Accordingly, the total weight of the booster 10 is calculated to a correspondingly lesser weight than otherwise would be the case for conventional boosters.

As shown in FIG. 1, the bolts 106 are cranked at the middle portion thereof in order to accomodate location discrepancy between engagements with the flange 108 and the shell 116. The washers 110 are shaped in double crank form as shown in FIG. 3 in order that a safe engagement may be ensured between the washers and the shell 16 by accomodating the constrictions 104.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A brake booster assembly of a vehicle having a dash board and a brake pedal comprising:
   a housing;
   a brake master cylinder connected to the housing;
   a diaphragm power piston positioned in said housing and dividing the housing into first and second fluid chambers and having a retracted position defined by abutment with the housing;
   a control valve mechanism for the diaphragm power piston for controlling a pressure differential between the chambers in response to movement of said brake pedal axially relative to the power piston; and
   at least two bolt members which extend from the master cylinder bypassing outside of the housing to said dash board of said vehicle for installation such that a brake reactional force is transmitted from the master cylinder to the dash board bypassing the housing wherein the housing is contoured so as to have a pair of recessed portions located symmetrically with respect to the center of the housing and the two bolt members pass through the recessed portions from the master cylinder to the dash board with both ends in thread and nut connection with the master cylinder and the dash board, respectively, whereby the housing is clamped between the master cylinder and the dash board.

2. An assembly according to claim 1, wherein the two bolt members each further comprise a washer at one end thereof adjacent the dash board, said washers being interposed between the dash board and the housing so that the housing is clamped across the washers between the master cylinder and the dash board.

3. An assembly according to claim 2, wherein the master cylinder further comprises a flange and the two bolt members are in the thread and nut connection with the flange, respectively.

4. A assembly according to claim 1, wherein the two bolt members are formed of a crank shape for accomodating any discrepancy between engagement with the master cylinder and the dash board at opposite ends of each of the two bolt members.

5. An assembly according to claim 2, wherein the washers are formed of a double crank shape to accommodate the recessed portions of the housing, respectively, in order that safe engagement may be ensured between the washers and the recessed portions.

* * * * *

Notice of Adverse Decision in Interference

In Interference No. 101,430, involving Patent No. 4,377,069, H. Kobayashi, BRAKE BOOSTER, final judgment adverse to the patentee was rendered Sept. 9, 1986, as to claims 1-5.

[*Official Gazette December 2, 1986.*]